United States Patent [19]

Garbo

[11] 4,322,910

[45] Apr. 6, 1982

[54] CRYOGENIC DEFOLIATION

[76] Inventor: Paul W. Garbo, 48 Lester Ave., Freeport, N.Y. 11520

[21] Appl. No.: 94,945

[22] Filed: Nov. 16, 1979

[51] Int. Cl.³ .............................................. A01G 1/00
[52] U.S. Cl. ...................................... 47/1.7; 47/1.43; 56/1
[58] Field of Search ...................... 47/1.7, 1.44, 1.43; 56/1; 62/239

[56] References Cited

U.S. PATENT DOCUMENTS

| | | | |
|---|---|---|---|
| 2,290,942 | 7/1942 | Clary et al. | 47/1.43 X |
| 3,263,439 | 8/1966 | Ross | 62/239 X |
| 3,341,970 | 9/1967 | Bailey | 47/1.7 |
| 3,472,004 | 10/1969 | Erby et al. | 47/1.7 X |

*Primary Examiner*—Robert E. Bagwill
*Attorney, Agent, or Firm*—Paul W. Garbo

[57] ABSTRACT

In the agriculture of various crops, required weeding or defoliation is commonly achieved by the application of chemicals or by flaming. Health and environmental hazards limit the number of chemicals which can be used. Chemicals are slow acting and can be prematurely washed away by rain. Flaming requires careful control and in many cases is impractical. Cryogenic defoliation carried out by spraying an inert liquefied gas such as nitrogen presents no health and environmental hazards and is not impaired by subsequent rain.

1 Claim, No Drawings

CRYOGENIC DEFOLIATION

BACKGROUND OF THE INVENTION

This invention relates to the elimination of undesired plants or parts thereof.

In the agriculture of various crops, required weeding or defoliation is commonly achieved by the application of chemicals or by flaming. The number of chemicals which can be legally used is restricted by health and environmental considerations. An approved chemical must present no health hazard to agricultural workers and must be free of environmental hazards, e.g., toxicity to birds and animals as well as contamination of water supplies. Furthermore, chemicals are slow acting so that their efficacy develops over a period of several days. Hence, rain can easily wash away a chemical before it has brought about the desired defoliation or weed destruction. The use of flames or, more broadly, heat to kill unwanted plants or foliage requires great care which translates into a high labor cost. Moreover, with many crops flaming or exposure to high temperatures is impractical because it cannot be confined to only undesired plant material.

Several forms of tunnel-like ovens adapted to straddle a row of plants and to move along the row to effect thermal plant conditioning have been disclosed as illustrated by U.S. Pat. Nos. 2,682,728, 3,477,174 and 3,626,636. The number of designs which have been proposed for such tunnel-like ovens suggests that thermal treatment of plants involves many difficulties.

One of the chemicals used to defoliate cotton plants prior to the harvesting of the cotton is superheated ammonia vapor as described in U.S. Pat. No. 3,238,667. Besides the cost of ammonia and the fuel required to convert liquid ammonia into superheated vapor, ammonia used as a defoliant has the further disadvantage of being a fertilizer which under certain ensuing weather conditions can promote second growth of new leaves.

In summary, while several chemicals and different forms of flaming are used to destroy weeds and to defoliate plants, each has inherent disadvantages.

Accordingly, a principal object of this invention is to achieve desired weed control and defoliation without creating any health or environmental hazards.

A further object is to use inert liquefied gases to eliminate undesired plant material.

These and other objects and advantages of the invention will be evident from the description which follows.

SUMMARY OF THE INVENTION

In accordance with this invention, a liquefied gas which is substantially inert and harmless to animal as well as plant life is used to effect cryogenic defoliation. The gases, which when liquefied are suitable for carrying out the cryogenic defoliation of this invention, are air, its components, nitrogen, oxygen and carbon dioxide, and mixtures thereof. As know, air also contains small amounts of other gases such as argon and krypton which are also inert. The liquefied gas is simply applied to unwanted plant material by fine spraying or misting to reduce the temperature of the plant material sufficiently to cause fatal injury thereto.

Obviously, to maximize the freezing and killing of plant material by a given amount of liquefied gas, the liquefied gas should be applied when the plants are cool, i.e, on very cloudy days or after sunset or during early morning. Of course, the liquefied gas can be applied at any time even during the hottest hours of a sunny day but the quantitiy of liquefied gas consumed to accomplish a given amount of defoliation will be greater than would be needed if applied at night.

Again, to economize the consumption of liquefied gas, it is advisable to use a tunnel-like hood to straddle the plants to be sprayed. The liquefied gas is atomized within the hood and thus is confined to the plants straddled by the hood. The design of such hoods is well known in the art of thermal plant conditioning as illustrated by the aforesaid U.S. Pat. No. 3,626,636. Such a hood would be stripped of its burners and associated piping. Atomizing nozzles would be installed in the hood at levels and at angles selected to give the best contact of the sprayed liquefied gas with the plants to be defoliated. To reduce the loss of refrigeration through the walls of the tunnel-like hood during the atomization of the liquefied gas, it is advisable to cover the walls of the hood with insulation.

DESCRIPTION OF PREFERRED EMBODIMENT

An important embodiment of the invention is the defoliation of cotton plants prior to harvesting the cotton.

A simple tunnel-like hood with insulated walls and dimensioned to straddle a row of cotton plants is supported on four wheels so that the hood can be drawn along the length of the plant row. Atomizing nozzles are mounted inside the hood at levels selected to give optimum coverage of the cotton plants to be defoliated. Liquid nitrogen is supplied through manifolds to the atomizing nozzles which are aimed at the cotton plants.

The resulting very cold nitrogen mist or fog envelops and permeates the cotton plants within the tunnel-like hood and rapidly damages the leaves. Thus, the leaves are killed and fall off the plants within a few days after being sprayed with liquid nitrogen.

The quantity of liquefied gas sprayed on the plants and the rate of travel of the hood along the row of plants are controlled to chill the leaves to a temperature of 0° C. or lower. Preferably, the leaves exiting from the moving tunnel-like hood are at a temperature of about $-5°$ C. Clearly, even lower temperatures will achieve cryogenic defoliation and may hasten the fall of leaves but the consequent greater consumption of liquefied gas generally will not be economically justified.

Unlike chemical defoliants which can be washed away by rain before they have achieved the desired defoliation, the efficacy of a sprayed liquefied gas of this invention is not impaired by subsequent rain. To the contrary, a driven rain can hasten the shedding of leaves after they have been exposed to the cold mist of a liquefied gas.

As previously mentioned, air, oxygen, carbon dioxide or any mixture of these gases with or without nitrogen can be used in liquid form in lieu of the liquid nitrogen in the preceding example of the invention. Obviously, the cheapest available liquefied gas should be selected, such as commercial grade liquid nitrogen.

The term, defoliation, is used herein and in the claims to cover broadly the killing and desiccation of weeds, vines and other plants as well as just the leaves of large plants. As disclosed in U.S. Pat. No. 3,335,552, cotton plants which have been exposed to a defoliant may have their cotton crop harvested after the leaves have been killed and desiccated and before the leaves have actually dropped off. The cryogenic defoliation of this invention also makes it possible to harvest cotton from treated plants before the desiccated leaves have fallen off but in most cases it is preferred to harvest cotton after the treated plants have shed the bulk of their leaves. An unexpected bonus or advantage of cryogenic defoliation is the simultaneous destruction of many insects, pests and molds which are injurious to crops.

Variations of the invention will be apparent to those skilled in the art. For example, a tunnel-like hood need not be used since its function is to minimize the loss of refrigeration to the atmosphere. Accordingly, only such limitations should be imposed on the invention as are set forth in the appended claims.

What is claimed is:

1. A process for defoliating cotton plants which comprises spraying said plants with liquefied carbon dioxide gas to reduce the temperature sufficiently to cause fatal injury to the leaves of said plants.

* * * * *